United States Patent
Taatjes et al.

(10) Patent No.: US 7,341,214 B2
(45) Date of Patent: Mar. 11, 2008

(54) CASSETTE SPOOL LOCK

(75) Inventors: Thomas L. Taatjes, Eden Prairie, MN (US); Benjamin N. Dunn, Savage, MN (US); Thomas McDonough, Inver Grove Heights, MN (US)

(73) Assignee: Stratasys, Inc., Eden Prairie, MN (US)

(*) Notice: Subject to any disclaimer, the term of this patent is extended or adjusted under 35 U.S.C. 154(b) by 456 days.

(21) Appl. No.: 11/172,356

(22) Filed: Jun. 30, 2005

(65) Prior Publication Data
US 2007/0001050 A1    Jan. 4, 2007

(51) Int. Cl.
B65H 18/28    (2006.01)
(52) U.S. Cl. .................. 242/170; 242/396.1; 242/588.3
(58) Field of Classification Search ................ 242/170, 242/384.7, 385.4, 396.1, 588.3, 588.6
See application file for complete search history.

(56) References Cited

U.S. PATENT DOCUMENTS

| | | | |
|---|---|---|---|
| 3,016,451 A | 1/1962 | Cornell |
| 3,381,812 A | 5/1968 | Cohen |
| 3,841,000 A | 10/1974 | Simon |
| 4,152,367 A | 5/1979 | Binsack et al. |
| 4,665,492 A | 5/1987 | Masters |
| 4,749,347 A | 6/1988 | Valavaara |
| 4,844,373 A | 7/1989 | Fike, Sr. |
| 4,928,897 A | 5/1990 | Satou et al. |
| 4,961,154 A | 10/1990 | Pomerantz et al. |
| 5,059,266 A | 10/1991 | Yamane et al. |
| 5,134,569 A | 7/1992 | Masters |
| 5,136,515 A | 8/1992 | Helinski |
| 5,140,937 A | 8/1992 | Yamane et al. |
| 5,149,548 A | 9/1992 | Yamane et al. |
| 5,169,081 A | 12/1992 | Goedderz |
| 5,204,055 A | 4/1993 | Sachs et al. |
| 5,216,616 A | 6/1993 | Masters |
| 5,257,657 A | 11/1993 | Gore |
| 5,263,585 A | 11/1993 | Lawhon et al. |
| 5,293,996 A | 3/1994 | Duncan |
| 5,303,141 A | 4/1994 | Batchelder et al. |
| 5,312,224 A | 5/1994 | Batchelder et al. |
| 5,340,433 A | 8/1994 | Crump |
| 5,402,351 A | 3/1995 | Batchelder et al. |
| 5,474,719 A | 12/1995 | Fan et al. |
| 5,503,785 A | 4/1996 | Crump et al. |
| 5,587,913 A | 12/1996 | Abrams et al. |
| 5,594,652 A | 1/1997 | Penn et al. |
| 5,695,707 A | 12/1997 | Almquist et al. |

(Continued)

FOREIGN PATENT DOCUMENTS

WO    WO 00/62994    10/2000

(Continued)

Primary Examiner—John Q. Nguyen
(74) Attorney, Agent, or Firm—Kinney & Lange, P.A.

(57) ABSTRACT

A cassette for use in delivering a continuous length of filament. The cassette includes a housing having a first aperture and a spool rotatably mountable in the cassette housing. The spool contains a first female receptacle alignable with the first aperture, and a flexible boot is attached to the cassette housing and aligned with the first aperture. A removable plug is insertable through the first aperture and into the flexible boot for receipt within the first female receptacle of the spool to prevent rotation of the spool within the cassette housing.

26 Claims, 7 Drawing Sheets

U.S. PATENT DOCUMENTS

| | | |
|---|---|---|
| 5,738,817 A | 4/1998 | Danforth et al. |
| 5,764,521 A | 6/1998 | Batchelder et al. |
| 5,807,437 A | 9/1998 | Sachs et al. |
| 5,866,058 A | 2/1999 | Batchelder et al. |
| 5,893,404 A | 4/1999 | Mendez et al. |
| 5,900,207 A | 5/1999 | Danforth et al. |
| 5,932,055 A | 8/1999 | Newell et al. |
| 5,943,235 A | 8/1999 | Earl et al. |
| 5,968,561 A | 10/1999 | Batchelder et al. |
| 6,004,124 A | 12/1999 | Swanson et al. |
| 6,054,077 A | 4/2000 | Comb et al. |
| 6,070,107 A | 5/2000 | Lombardi et al. |
| 6,085,957 A | 7/2000 | Zinniel et al. |
| 6,119,567 A | 9/2000 | Schindler et al. |
| 6,127,492 A | 10/2000 | Nagashima et al. |
| 6,129,872 A | 10/2000 | Jang |
| 6,162,378 A | 12/2000 | Bedal et al. |
| 6,165,406 A | 12/2000 | Jang et al. |
| 6,175,422 B1 | 1/2001 | Penn et al. |
| 6,193,923 B1 | 2/2001 | Leyden et al. |
| 6,214,279 B1 | 4/2001 | Yang et al. |
| 6,228,923 B1 | 5/2001 | Lombardi et al. |
| 6,257,517 B1 | 7/2001 | Babish et al. |
| 6,261,077 B1 | 7/2001 | Bishop et al. |
| 6,322,728 B1 | 11/2001 | Brodkin et al. |
| 6,572,228 B2 | 6/2003 | Kaga et al. |
| 6,645,412 B2 | 11/2003 | Priedeman, Jr. et al. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,749,414 B1 | 6/2004 | Hanson et al. |
| 6,776,602 B2 | 8/2004 | Swanson et al. |
| 6,814,907 B1 | 11/2004 | Comb |
| 6,866,807 B2 | 3/2005 | Comb et al. |
| 7,063,285 B1 * | 6/2006 | Turley et al. ............... 242/171 |

FOREIGN PATENT DOCUMENTS

| | | |
|---|---|---|
| WO | WO 02/06029 | 1/2002 |
| WO | WO 02/093360 | 11/2002 |
| WO | WO 2004/003823 | 8/2004 |

* cited by examiner

CASSETTE SPOOL LOCK

BACKGROUND OF THE INVENTION

The present invention relates to dispensers for flexible strand materials. In particular, the present invention relates to cassettes that deliver modeling material in the form of continuous filaments to a modeling machine for building three-dimensional objects.

Extrusion-based layered manufacturing machines build three-dimensional objects or models by extruding solidifiable modeling material from extrusion heads in predetermined patterns, based upon design data provided from computer aided design (CAD) systems. One technique for supplying modeling material to an extrusion head is in the form of a filament strand. The modeling material is then extruded layer-by-layer in areas defined from the CAD model. The material being extruded fuses to previously deposited material and solidifies to form a three-dimensional object resembling the CAD model.

One technique for supplying modeling material to a three-dimensional modeling machine includes providing modeling filament in an enclosed cassette. The cassette contains spooled filament which is advanced to the machine through an exit orifice of the cassette. The cassette can be made air tight and sealed so that the filament can be kept in a dry environment. As many modeling materials are moisture sensitive (e.g. high-temperature thermoplastics), maintaining dryness of the filament is desirable for building accurate, robust models. However the problem with this delivery system is that the spool can rotate inside of the cassette during transport and handling. This inadvertent rotation may cause the filament to unravel, which may result in tangling or breakage. In such a case, the cassette may fail to properly deliver filament to a modeling machine. As such, it is desirable to maintain a sealed cassette while increasing the reliability of filament to modeling machines.

BRIEF SUMMARY OF THE INVENTION

The present invention includes a cassette for delivering a continuous length of filament, which includes a cassette housing, a spool, a flexible boot, and a removable plug. The cassette housing contains a spool and has an aperture that aligns to a female receptacle in the spool. A flexible boot is attached to the cassette housing and is aligned with the aperture. The flexible boot accepts a removable plug that may be inserted through the aperture and into the flexible boot thereby inserting both the flexible boot and the plug into the female receptacle and rotatably locking the spool relative to the cassette housing. The present invention further includes a method of inserting the plug into the flexible boot. The method entails rotating the spool to align the female receptacle and the aperture, and inserting the plug and flexible boot into the female receptacle.

DETAILED DESCRIPTION

Figure 1:
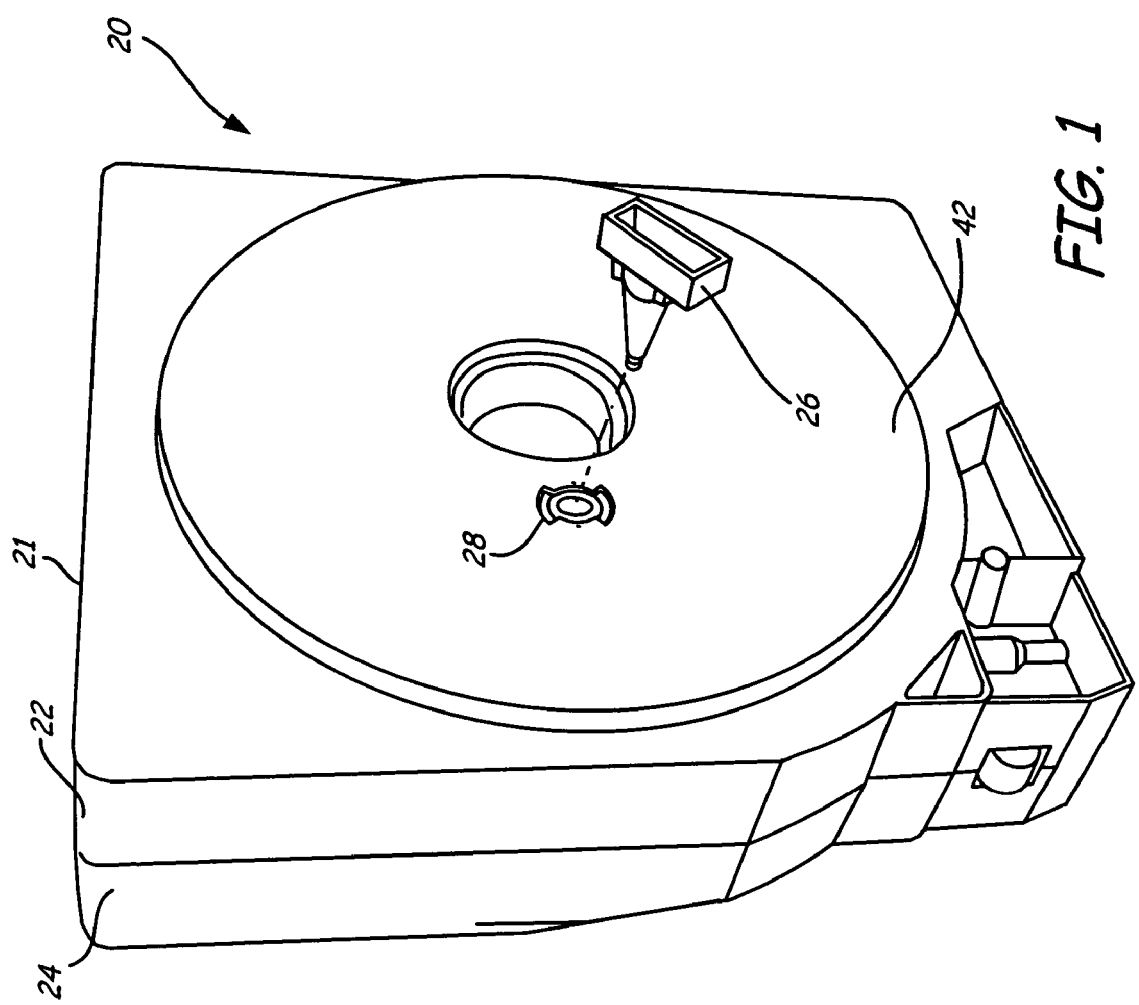
FIG. 1 is a perspective view of a filament cassette of the present invention.

FIG. 1 is a perspective view of filament cassette 20 which is a container for delivering a continuous length of filament to an extrusion-based layered manufacturing machine. Examples of suitable filament cassettes for filament cassette 20 are disclosed in U.S. Pat. No. 6,776,602 ("the '602 patent"). Filament cassette 20 includes housing 21 having upper shell 22 and lower shell 24, and removable plug 26. Upper shell 22 has outer surface 42 and includes aperture 28, which is a bayonet mount aperture. Upper shell 22 and lower shell 24 mate together forming a seal to reduce moisture entry. Removable plug 26 is insertable into aperture 28 and may then be locked relative to upper shell 22.

Figure 2:
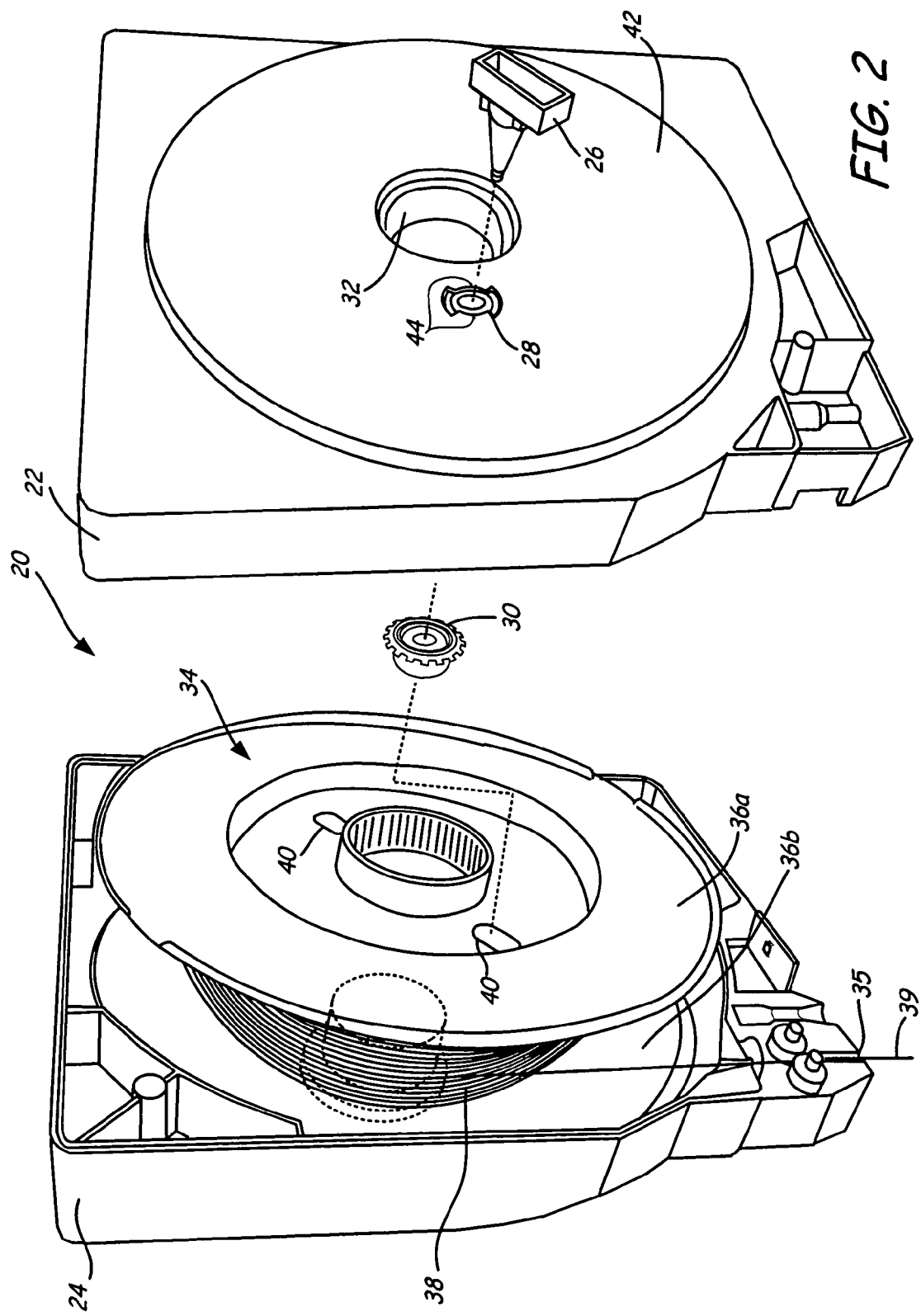
FIG. 2 is an exploded view of the filament cassette.

FIG. 2 is an exploded view of filament cassette 20 and further illustrates the internal components of filament cassette 20. As shown, filament cassette 20 also includes flexible boot 30, spool 34, filament exit orifice 35, and projections 44. Flexible boot 30 is attached to upper shell 22 adjacent to and aligned with aperture 28, which creates a seal around aperture 28 that substantially prevents the entry of air and moisture. Upper shell 22 further includes hub 32, and lower shell 24 also includes a mirror of hub 32 shown in phantom in FIG. 2. Spool 34 is rotatably mountable on hub 32 and its mirror hub when upper shell 22 and lower shell 24 are closed together.

Spool 34 carries filament coil 38. Filament 39 unwinds from spool 34 and exits filament cassette 20 through exit orifice 35. Spool 34 also has two side surfaces 36a and 36b. Side surface 36a includes female receptacle 40 that, when positioned correctly, aligns with aperture 28 of upper shell 22 for receiving flexible boot 30 and removable plug 26. Female receptacle 40 is preferably an elongated slot that allows for easy insertion of removable plug 26, but may also be a recess or a hole.

Projections 44 consist of raised surfaces for inhibiting rotation of removable plug 26 when removable plug 26 is lockably engaged into aperture 28. As such, aperture 28 provides an insertion point for removable plug 26 that allows for securement of removable plug 26. This lockable engagement prevents removable plug 26 from disengaging from aperture 28 during transportation and handling of filament cassette 20.

Where dry conditions are desired inside filament cassette 20, packets of desiccant (not shown) are preferably placed inside cassette housing 21. Furthermore, the interior of filament cassette 20 is desirably dried for moisture sensitive materials. Suitable drying methods are disclosed in the '602 patent, such as desiccant drying and oven drying.

Figure 3:
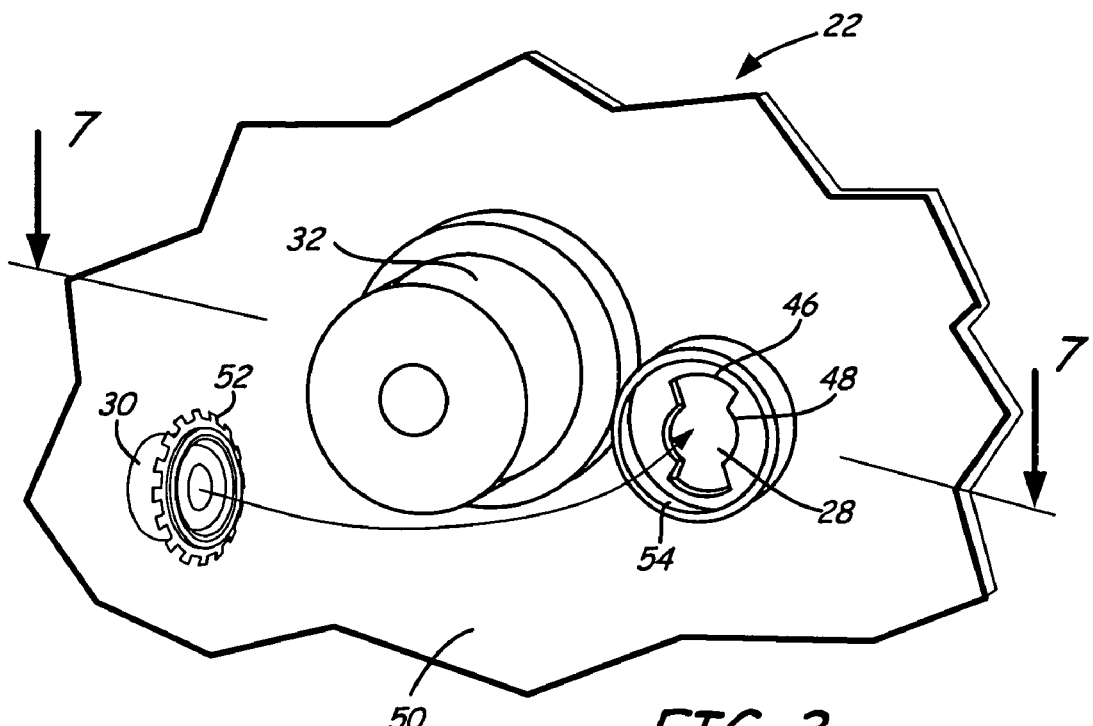
FIG. 3 is an expanded perspective view of the filament cassette showing a portion of an inner surface and a flexible boot.

FIG. 3 is an expanded perspective view of inner surface 50 taken from a rear view of upper shell 22 in FIG. 2. Upper shell 22 includes aperture 28, flexible boot 30 and star washer 52. Aperture 28 includes radial arc retaining cutaways 46 and radial arc retaining edges 48. Both radial arc cutaways 46 and radial arc retaining edges 48 are formed in upper shell 22. Radial arc cutaways 46 allow for insertion of removable plug 26 while radial arc retaining edges 48 provide a means for lockably engaging removable plug 26 within aperture 28.

Flexible boot 30 is pressed against inner surface 50 and star washer 52 encircles flexible boot 30. Star washer 52 engages retaining surface 54, thereby maintaining a seal between inner surface 50 and flexible boot 30. The seal results in a substantially moisture-proof barrier, which reduces moisture entry into filament cassette 20 via aperture 28.

Figure 4:
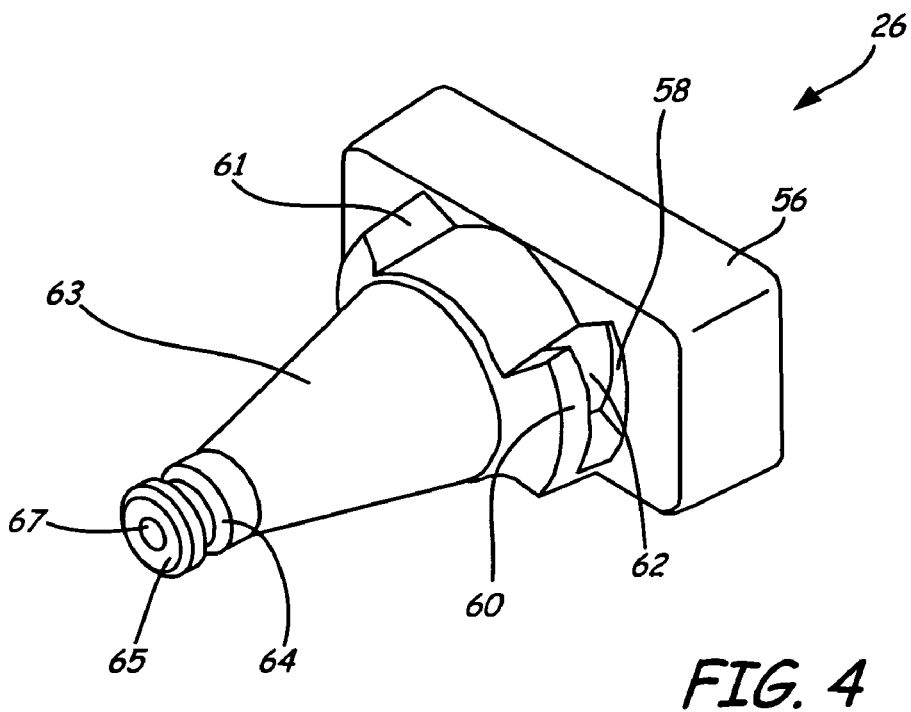
FIG. 4 is a perspective view of a removable plug.

FIG. 4 is a perspective view of removable plug 26, which includes handle 56, tapered shaft 63 and tip 65. Additionally, removable plug 26 includes retaining aperture 58, retaining collar 60, rotational stops 61, track 62, engagement channel 64, and relief hole 67. Retaining collar 60 is an arc shaped lip that extends beneath handle 56 such that the space between handle 56 and retaining collar 60 forms track 62. Track 62 engages radial arc retaining edges 48 of upper shell 22 and ends at rotational stops 61. Tapered shaft 63 extends from retaining collar 60 while engagement channel 64 is a circular channel that defines tip 65 of tapered shaft 63 and relief hole 67 passes through tip 65. While this embodiment utilizes a shaft with a taper, tapered shaft 63 could be a columnar shaft, rod or other rigid protrusion that allows for reduced drag interaction with flexible boot 30.

Retaining collar 60 is sized and positioned to clear radial arc cutaways 46 during insertion of removable plug 26 into aperture 28. Then track 62 accepts radial arc retaining edges 48 of upper shell 22 as removable plug 26 is rotated. As such, removable plug 26 may be inserted into aperture 28 when retaining collar 60 is aligned with radial arc cutaways 46. Removable plug 26 may then be rotated by handle 56 until rotational stops 61 contact radial arc retaining edges 48. This rotation results in track 62 engaging radial arc retaining edges 48 and locking removable plug 26 relative to housing 21.

In at least one embodiment, retaining aperture 58 is an elongated arcuate slot located in the base of handle 56. Alternatively, retaining aperture 58 can be a recess, dimple, or other cavity for engaging projections 44. When handle 56 is rotated into its locked position, projections 44 extend into retaining aperture 58. This inhibits removable plug 26 from rotating loose and disengaging from female receptacle 40. As a result, removable plug 26 is prevented from disengaging spool 34 during transportation and handling of filament cassette 20.

Figure 5:
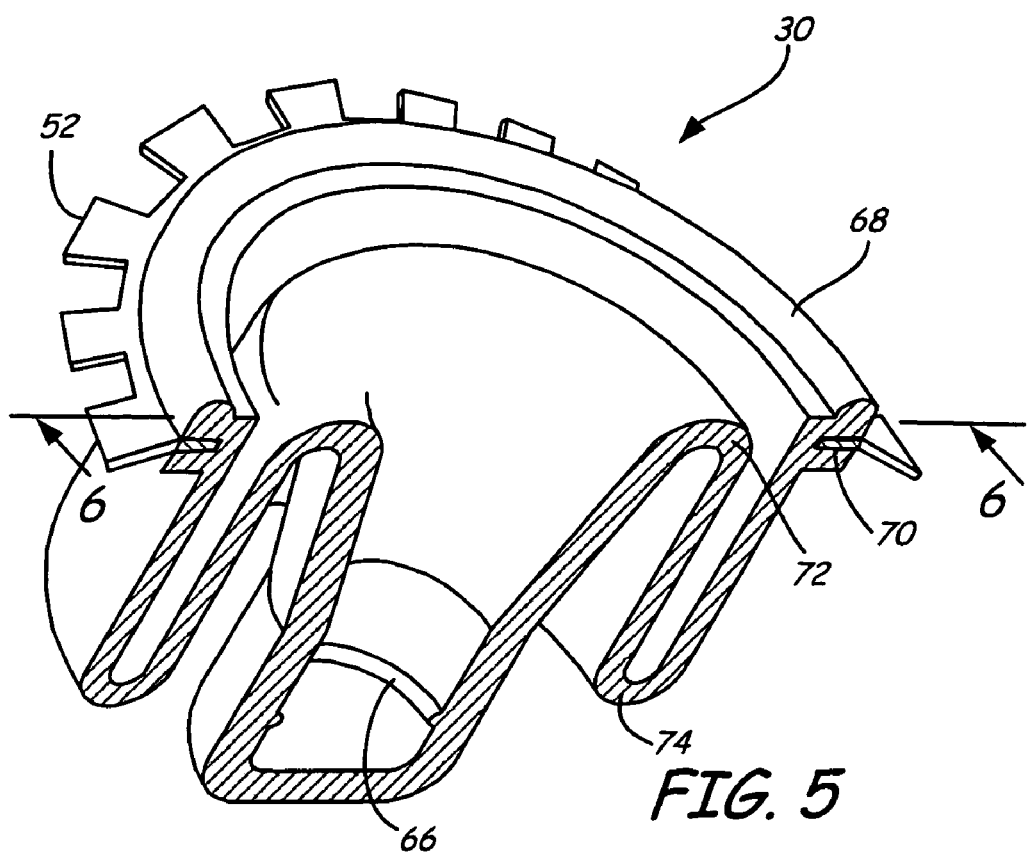
FIG. 5 is a sectional perspective view of the flexible boot.
Figure 6:
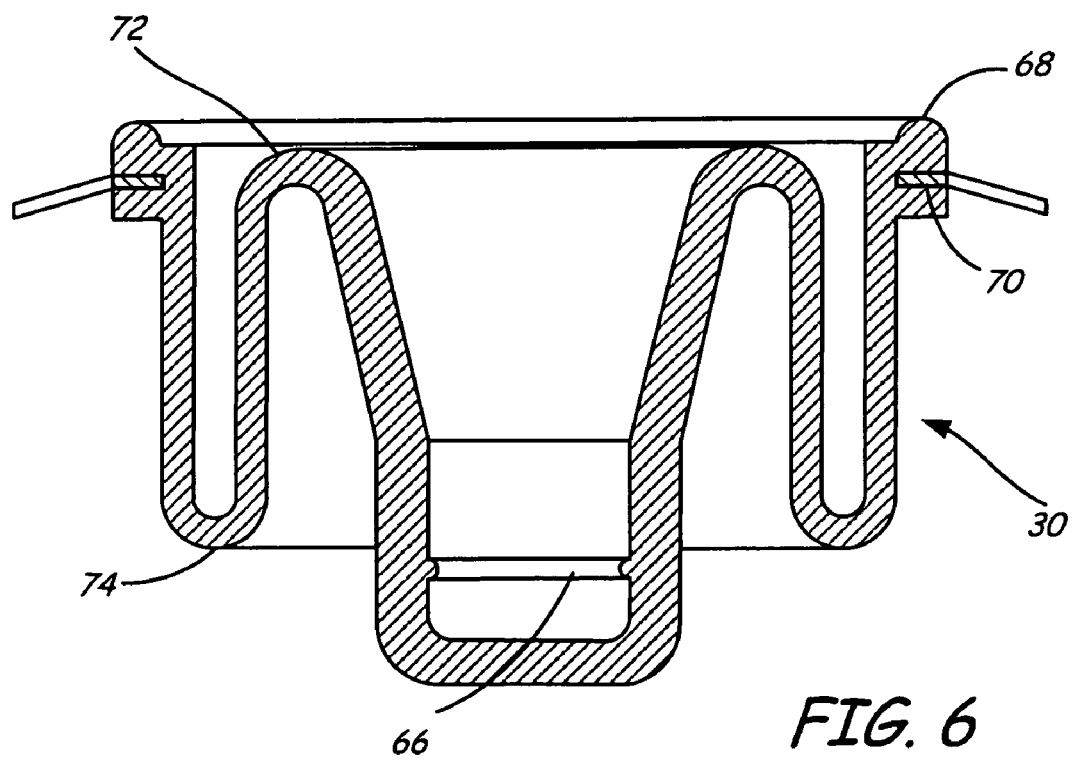
FIG. 6 is a sectional side view of the flexible boot.

FIG. 5 is a sectional perspective view of flexible boot 30 and FIG. 6 is a sectional side view of flexible boot 30. Flexible boot 30 includes retaining ring 66, seal surface 68, circumferential slot 70, and upper and lower tiers 72 and 74. Flexible boot 30 is made of a vapor-proof material for preventing moisture transmission, such as EPDM. Flexible boot 30 is a two-tiered structure having upper tier 72, lower tier 74 and a taper leading into its bottom end. Insertion of removable plug 26 into flexible boot 30 extends upper tier 72 from a retracted position towards lower tier 74. Upon extension of upper tier 72, an internal tension is created such that flexible boot 30 returns to the retracted position upon removal of tapered shaft 63. Upper tier 72 and lower tier 74 allow for the creation of internal tension while reducing stress in flexible boot 30, thereby reducing fatigue in flexible boot 30. Furthermore, upper tier 72 and lower tier 74 minimize the force required to insert removable plug 26 and likewise reduce the force on upper shell 22 while removable plug 26 is engaged. While not required, use of upper tier 72 and lower tier 74 also enables smoother retraction of flexible boot 30 from female receptacle 40. Alternatively, flexible boot 30 may comprise a single sleeve with clearance between flexible boot 30 in an unstretched position, and yet capable of stretching to insert flexible boot 30 into female receptacle 40 by removable plug 26.

Retaining ring 66 is a ring formed near the bottom end of the inside surface of flexible boot 30. Tip 65 engages flexible boot 30 with enough tension to prevent flexible boot 30 from remaining in female receptacle 40 upon removal of removable plug 26. However, the tension between tip 65 and retaining ring 66 is not enough to pull flexible boot 30 through aperture 28 upon removal of removable plug 26. This prevents flexible boot 30 from hindering spool 34 rotation by remaining in female receptacle 40 upon removal of removable plug 26. This also prevents flexible boot 30 from extending outside upper shell 22 and preventing insertion of filament cassette 20 into extrusion-based layered manufacturing machines. In one embodiment, relief hole 67 is placed at the end of tip 65 to reduce the vacuum formation between removable plug 26 and flexible boot 30. Reduction of vacuum formation further between removable plug 26 and flexible boot 30 prevents flexible boot 30 from being pulled through aperture 28 upon removal of flexible plug 26.

Seal surface 68 mates with inner surface 50 of upper shell 22 and circumferential slot 70 carries star washer 52. Star washer 52 affixes flexible boot 30 to upper shell 22. Star washer 52 is pressed against retaining surface 54 for maintaining a substantially moisture proof seal between seal surface 68 and upper shell 22. While this embodiment utilizes star washer 52 for attaching flexible boot 30 to upper shell 22, a person of ordinary skill in the art would recognize that any sealable attachment method may be suitable.

Figure 7A:
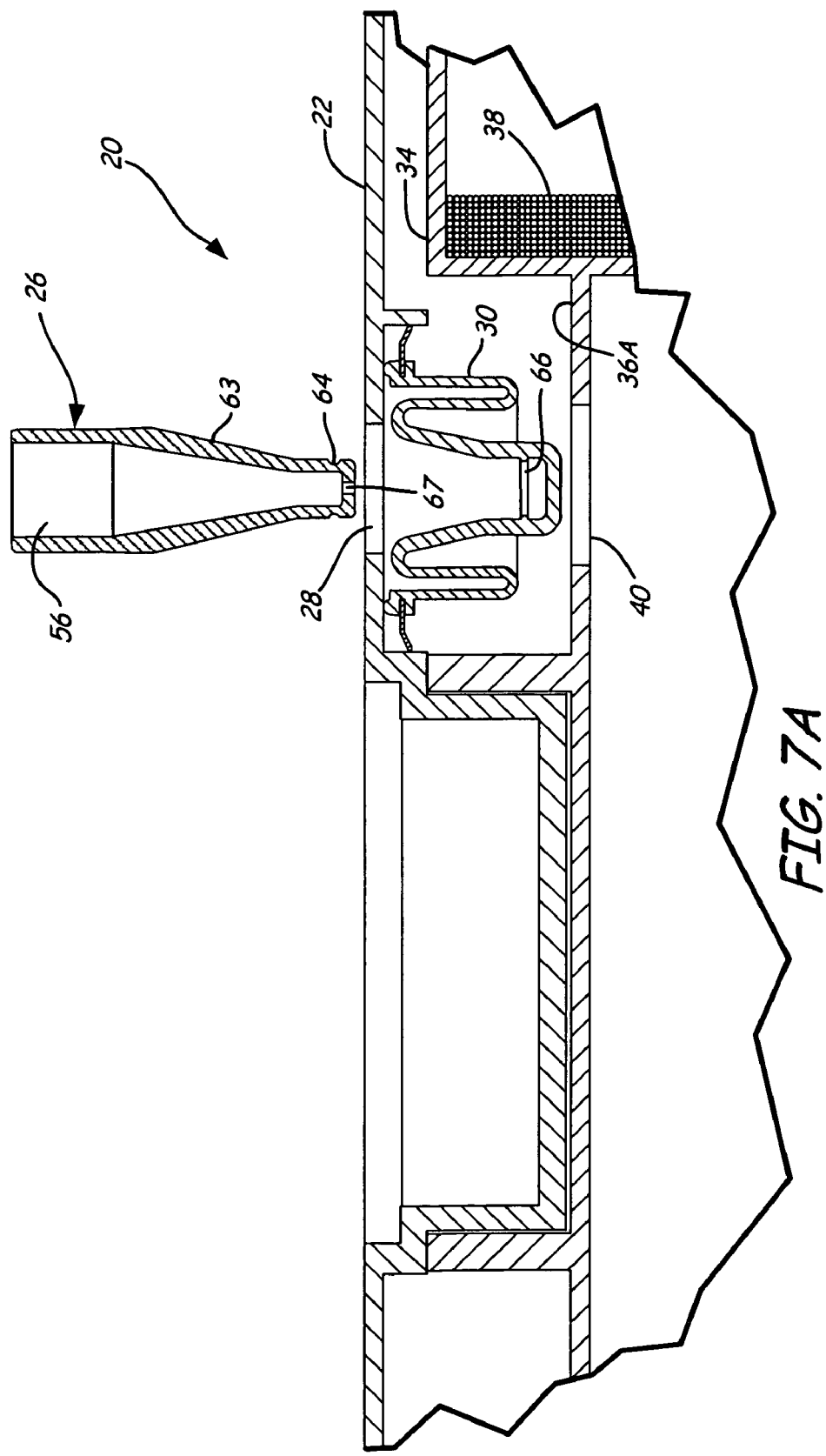
FIG. 7A is a sectional view of the filament cassette taken along section 7-7 in FIG. 3 showing the removable plug aligned above a non-extended flexible boot.
Figure 7B:
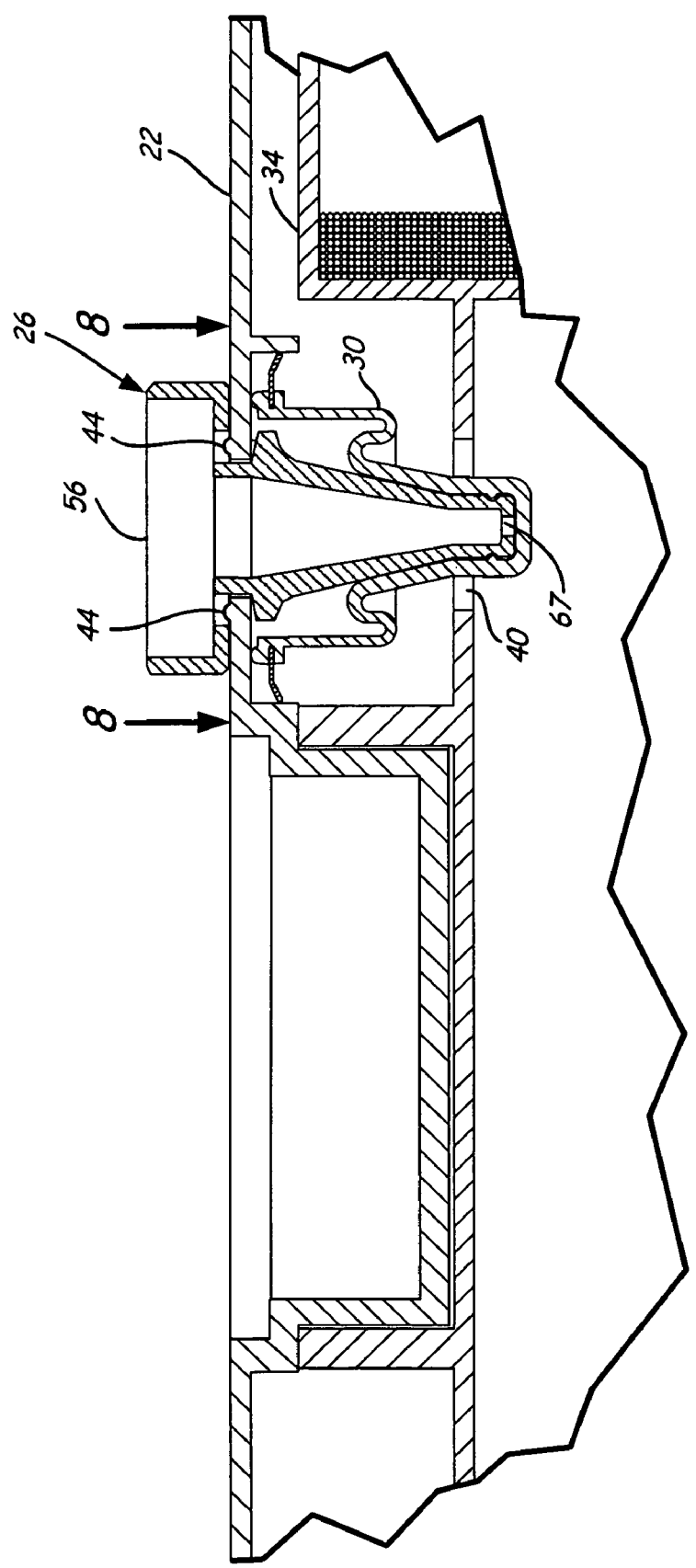
FIG. 7B is a sectional view of the filament cassette taken along section 7-7 in FIG. 3 showing the removable plug inserted into the flexible boot and both the removable plug and flexible boot extending into a female receptacle.

FIGS. 7A and 7B are sectional views of section 7-7 in FIG. 3 further illustrating how removable plug 26 rotatably locks spool 34 relative to upper shell 22. FIG. 7A shows removable plug 26 aligned above aperture 28 and flexible boot 30 prior to insertion. FIG. 7B shows removable plug 26 after insertion into aperture 28 and flexible boot 30.

As shown in FIG. 7A, aperture 28 and flexible boot 30 are aligned with female receptacle 40. Flexible boot 30 is attached to upper shell 22 and is shown in FIG. 7A in the retracted position. This provides clearance between flexible boot 30 and spool 34 thereby allowing unhindered rotation of spool 34 while maintaining a seal for reducing moisture entry at aperture 28. As further illustrated in FIG. 7A, removable plug 26 includes handle 56 and engagement channel 64. A user may align removable plug 26 above aperture 28 by gripping handle 56 and positioning removable plug 26 such that engagement channel 64 extends toward aperture 28.

Spool 34 may be secured relative to upper shell 22, thereby reducing the risk of unraveling filament coil 38, by inserting removable plug 26 through aperture 28 and into flexible boot 30. Pressure is then applied to removable plug 26, thereby causing tip 65 to pass through retaining ring 66 resulting in retaining ring 66 seating in engagement channel 64. If aperture 28 is aligned with female receptacle 40, removable plug 26 extends flexible boot 30 until both are inserted into female receptacle 40 as illustrated in FIG. 7B. If aperture 28 is not aligned with female receptacle 40, removable plug 26 extends flexible boot 30 until flexible boot 30 makes contact with side surface 36a. Next, spool 30 is rotated until female receptacle 40 aligns with removable plug 26 and flexible boot 30. Removable plug 26 and flexible boot 30 are then inserted into female receptacle 40 as spool 30 is advanced. One method of advancing spool 34 is to advance filament strand 39 of filament coil 38 through filament exit orifice 35. In this method, filament strand 39 is retained outside of exit orifice 35 prior to insertion of removable plug 26. A further step may include rotating removable plug 26 upon insertion, thereby securing removable plug 26 relative to upper shell 22.

With spool 34 rotatably locked into place, filament strand 39 is pulled tight, removing any slack in filament coil 38. Filament strand 39 is then secured so filament coil 38 is held in tension. Filament strand 39 may be secured by wrapping a piece of tape around filament strand 39 at filament exit orifice 37, or by other means as will be apparent to those skilled in the art. Any loose end of filament strand 39 protruding from filament cassette 20 may then be cut off. Locking spool 34 with the filament held in tension prevents filament coil 38 from loosening, unraveling, and becoming tangled inside filament cassette 20.

Furthermore, filament cassette 20 may be refilled by either adding filament to spool 34 or by replacing spool 34 with a new spool containing filament. The procedure detailed above can also be used for locking a replacement spool and ensuring tension in replacement filament.

As shown in FIG. 7B, when removable plug 26 is inserted and locked in place with respect to upper shell 22, handle 56 extends above upper shell 22. Removable plug 26 is rigid and when inserted into flexible boot 30 it prevents rotation of spool 34 by physical contact between flexible boot 30 and the perimeters of female receptacle 40. Due to the limited clearance provided for filament cassettes in extrusion-based layered manufacturing machines, handle 56 may have to be removed from upper shell 22 prior to inserting filament cassette 20 into extrusion-based layered manufacturing machines. This feature aids users by preventing insertion of a locked filament cassette and requiring troubleshooting to determine the reason for the extrusion-based layered manufacturing machine's failure.

Figure 8:
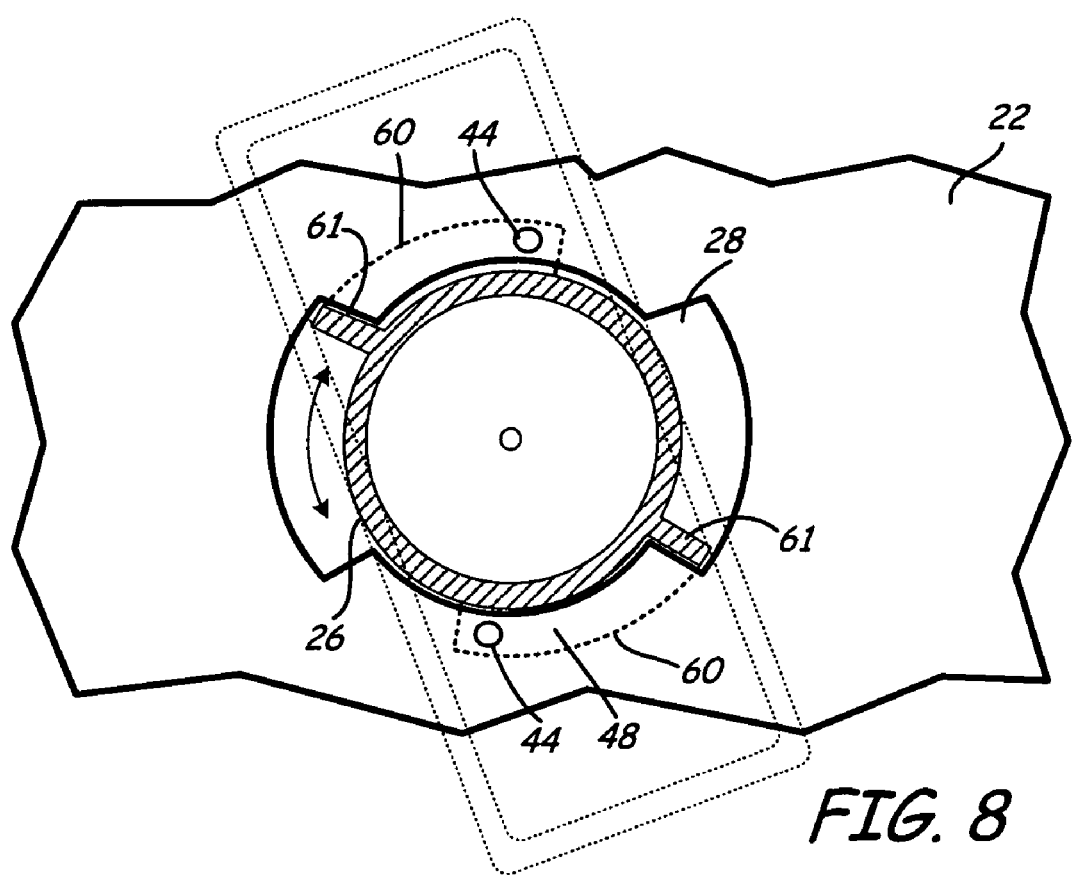
FIG. 8 is an expanded sectional view of the filament cassette taken along section 8-8 in FIG. 7B showing the removable plug inserted and locked.

FIG. 8 is an expanded sectional view of filament cassette 20 taken along section 8-8 in FIG. 7B. As shown in FIG. 8, removable plug 26 is inserted and locked into aperture 28. Removable plug 26 is rotated into a locked position such that retaining collar 60, shown in phantom in FIG. 8, is engaged with radial arc retaining edges 48 and rotational stops 61 contact radial arc retaining edges 48. Rotational stops 61 prevent over-rotation of removable plug 26 and projections 44 inhibit reverse-rotation of removable plug 26 back to a removal orientation. As such, rotational stops 61 and projections 44 ensure that removable plug 26 remains locked relative to upper shell 22 during transportation and storage.

Although the present invention has been described with reference to preferred embodiments, workers skilled in the art will recognize that changes may be made in form and detail without departing from the spirit and scope of the invention. For example, the cassette of the present invention is designed for use in providing modeling material to a three-dimensional modeling machine that receives modeling material in filament form, it is expected that the cassette can also be used in other fields that make use of spooled flexible strand materials.

The invention claimed is:

1. A cassette for delivering filament, the cassette comprising:
    a cassette housing having a first aperture;
    a spool rotatably mountable in the cassette housing, wherein the spool comprises a first female receptacle alignable with the first aperture;
    a flexible boot attached to the cassette housing and aligned with the first aperture; and
    a removable plug insertable into the first aperture and the flexible boot for receipt within the first female receptacle of the spool to prevent rotation of the spool within the cassette housing.

2. The cassette of claim 1 wherein the first female receptacle is radially elongated allowing for smooth insertion of the removable plug.

3. The cassette of claim 1 wherein the flexible boot comprises two tiers for reducing insertion force required to insert the removable plug and facilitating retraction of the flexible boot from the first female receptacle.

4. The cassette of claim 1 wherein the flexible boot includes a seal surface for mating with the cassette housing and providing a substantially moisture proof seal.

5. The cassette of claim 1 wherein the flexible boot is extendable from a retracted position.

6. The cassette of claim 1 wherein the flexible boot comprises an inner surface that defines a lower wall, wherein the lower wall of the inner surface includes a retaining ring.

7. The cassette of claim 6 wherein the removable plug includes an engagement channel for mating with the retaining ring, such that the flexible boot is retracted from the first female receptacle upon removal of the removable plug.

8. The cassette of claim 1 wherein the removable plug includes a relief hole for reducing vacuum formation between the flexible boot and the removable plug.

9. The cassette of claim 1 wherein the removable plug includes a handle, wherein the handle extends out from the cassette housing.

10. The cassette of claim 9 wherein the cassette housing has an outer surface including at least one projection and the handle of the removable plug includes a bottom surface having a first retaining aperture allowing for rotatable engagement of the at least one projection, thereby inhibiting removal rotation of the removable plug.

11. The cassette of claim 1 wherein the cassette housing includes a bayonet mount aperture aligned with the flexible boot.

12. The cassette of claim 11 wherein the removable plug includes a locking collar for rotational engagement of the bayonet mount aperture, thereby securing the removable plug relative to the housing.

13. A method of locking a spool containing filament while retaining a substantially moisture free environment, the method comprising:
    inserting a removable plug through an aperture in the cassette housing and into a flexible boot in a retracted position, wherein the flexible boot is secured to the cassette housing and aligned with the aperture in the cassette housing;
    rotating the spool until a female receptacle in the spool aligns with the aperture in the cassette housing; and
    inserting the removable plug and the flexible boot into an extended position and into the female receptacle of the spool.

14. The method of claim 13 further comprising the step of rotating the removable plug after insertion, thereby securing the removable plug to the cassette housing.

15. The method of claim 13 further comprising the step of securing the filament as it passes through an exit orifice, thereby holding the filament in tension.

16. A cassette for delivering a continuous length of filament comprising:
    a cassette housing having an interior chamber;
    a spool rotatably mountable in the interior chamber, wherein the spool comprises a side surface and the side surface comprises a first female receptacle;

a flexible boot attached to the housing, wherein the flexible boot is alignable with the first female receptacle of the spool; and a removable plug for insertion into the flexible boot, wherein the spool is locked relative to the housing upon insertion of the removable plug and flexible boot into the first female receptacle.

17. The cassette of claim 16 wherein the first female receptacle is radially elongated allowing for smooth insertion of the removable plug.

18. The cassette of claim 16 wherein the flexible boot comprises two tiers for reducing insertion force required to insert the removable plug and facilitating retraction of the flexible boot from the first female receptacle.

19. The cassette of claim 16 wherein the flexible boot includes a seal surface for mating with the cassette and providing a substantially moisture proof seal.

20. The cassette of claim 16 wherein the flexible boot is extendable from a retracted position.

21. The cassette of claim 16 wherein the flexible boot comprises an inner surface that defines a lower wall, wherein the lower wall of the inner surface includes a retaining ring.

22. The cassette of claim 21 wherein the removable plug includes an engagement channel for mating with the retaining ring, such that the flexible boot is retracted from the first female receptacle upon removal of the removable plug.

23. The cassette of claim 16 wherein the removable plug includes a handle, wherein the handle extends out from the cassette housing.

24. The cassette of claim 23 wherein the cassette housing has an outer surface including at least one projection and the handle of the removable plug includes a bottom surface having a first retaining ring allowing for rotatable engagement of the at least one projection, thereby inhibiting removal rotation of the removable plug.

25. The cassette of claim 16 wherein the cassette housing includes a bayonet mount aperture aligned with the flexible boot.

26. The cassette of claim 25 wherein the removable plug includes a locking collar for rotational engagement of the bayonet mount aperture, thereby securing the removable plug relative to the housing.

* * * * *